Feb. 3, 1925.                                                    1,525,295
F. HADFIELD
REVERSE ROTATION PREVENTING DEVICE
Filed May 5, 1924                    2 Sheets-Sheet 2
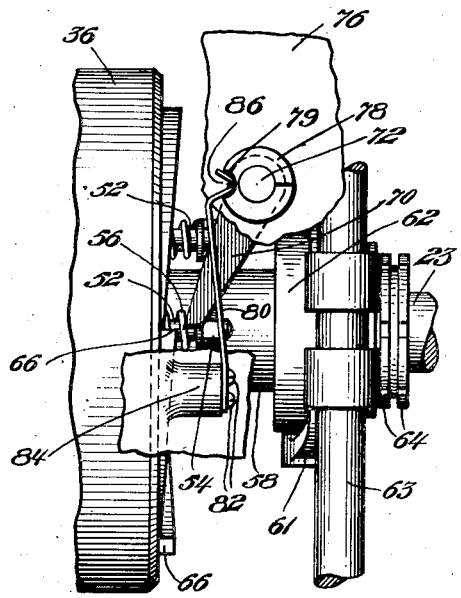
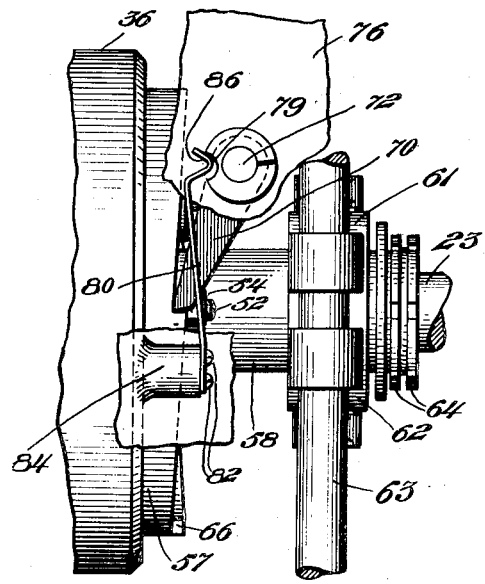
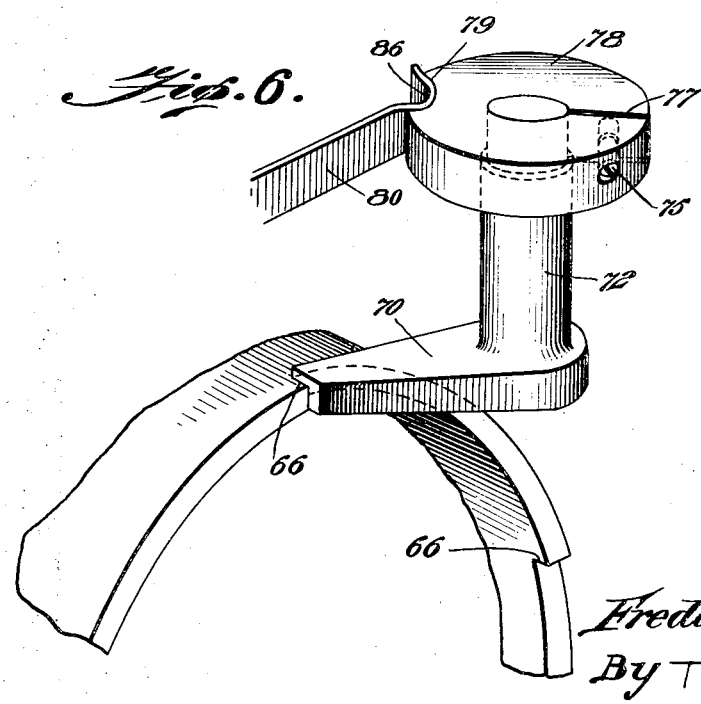
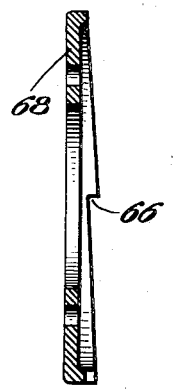
Inventor
Frederick Hadfield
By Thomas A. Jenckes Jr.
Attorney Patented Feb. 3, 1925.

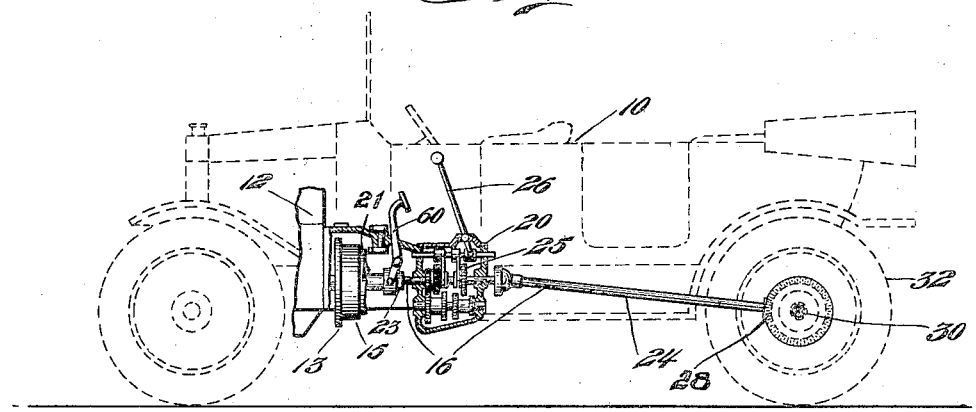
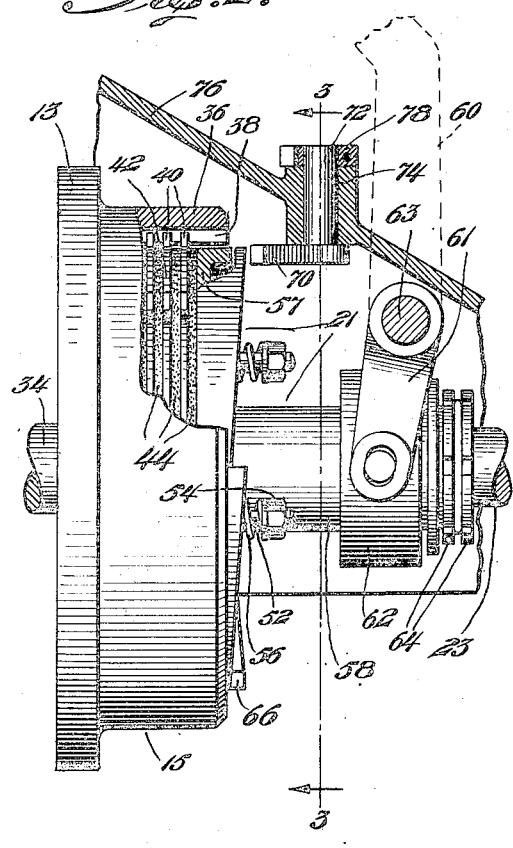

1,525,295

UNITED STATES PATENT OFFICE.

FREDERICK HADFIELD, OF MILLVILLE, MASSACHUSETTS.

REVERSE-ROTATION-PREVENTING DEVICE.

Application filed May 5, 1924. Serial No. 711,079.

*To all whom it may concern:*

Be it known that I, FREDERICK HADFIELD, a citizen in the United States, residing at Millville, of the county of Worcester and State of Massachusetts, have invented certain new and useful Improvements in Reverse-Rotation-Preventing Devices, of which the following is a specification.

My invention relates to reverse rotation preventing devices, especially adapted for use with the propelling shafts of motor vehicles.

I am aware that hitherto various types of one-way brakes, including clutch devices, pawl and ratchet devices, etc., to prevent reverse rotation of a shaft have been employed. Especially in vehicles one-way brakes of various types, such as pawls adapted to engage ratchets, clutches, etc. on the wheels, propeller shafts, in the gear box or on various other parts of the transmission system, have been used but so far as I am aware no-one has to date conceived of the advantages of such a device cooperating with a clutch used for other purposes. Most automobiles on the market today have a gear box with its various gears interposed in the transmission system between the wheels and driving means thereof. A clutch having a driving member axially fixed and an axially slidable driven member connected to the propeller shaft is also a common feature of most automobiles on the market today. So far as I am aware no-one has hitherto provided a locking means such as a ratchet attached to a fixed part of an automobile adjacent to the usual slidable driven clutch member adapted to engage said member when it is axially withdrawn away from the propeller shaft actuating mechanism and to prevent reverse rotating thereof. A further desirable feature of this combination is that the gearing inserted between the clutch and the wheels, breaks the drive between the wheels and clutch, so that the safety device may only operate when the motor is in gear. It is thus apparent that means already attached to the automobile permit the safety device only to function when desired. The gearing also so reduces the power of the backward drive that such a comparatively small element as a pawl may break the weight of the whole car. A further advantageous feature of this combination is that at the moment a safety device to prevent backward movement of an automobile is most needed as just before applying the power going up a hill, the car is normally in gear and the clutch is normally disengaged, the exact position for my improved safety device to function.

As explained not only do I provide a true new combination with the already existing parts of an automobile, but I also provide a device adapted to prevent reverse rotation of any clutch driven shaft, and provide an improved specific form of pawl and ratchet mechanism provided with safety means to keep the pawl out of engagement with the ratchet except when desired.

One object of my invention therefor is to provide an improved safety device for pawl and ratchet mechanisms.

A further object of my invention is to provide I believe for the first time in combination with the clutch of a clutch driven shaft of a safety device to prevent reverse rotation thereof.

A further object of my invention is to provide in combination with the usual clutch and gearing of the propelling shaft of an automobile of a safety device for preventing backward movement of the automobile which cooperates to effect this result in combination with said usual gearing and clutch.

The advantages of such a device in an automobile are obvious. Drivers of automobiles are well aware of the great difficulty in starting a car on an up-grade. One foot is needed for the accelerator, so the foot-brake cannot be used. The emergency brake must be pulled up by hand, and let off at just the right moment or the car will be stalled, and the engine must be raced to give the desired momentum when the clutch is let in with the other foot. Novices always stall cars and then in traffic crash into the people behind them. As the brakes are usually on, as the clutch is engaged, the occupants practically always are subjected to a jerk, and the transmission and rear end of the car to a severe strain.

The present construction causes great strain on the car, and makes it a requisite of a driver that he have three feet, one for the clutch, one for the accelerator and one for the foot brake, and is the cause of many accidents.

With my invention as the pawl engages the ratchet and the power of the backward drive of the vehicle is so reduced by the gearing that a small pawl can bear the weight of the car, the vehicle is locked against backward movement on a grade without the use of brakes. It may only be locked temporarily in starting, or will remain locked without any strain on the brakes when left for a period of time on a grade. The device is automatic as it functions every time the clutch is disengaged its full limit. It does not interfere with gear shifting or otherwise upset the mechanism of the automobile. It prevents stalling on grades when starting, and backward movement to bump into traffic behind. It limits the necessity of using the foot or emergency-brake when stopped for a short time on hills, and the use of the emergency-brake so long as the clutch is held disengaged and the gears are in mesh, and it leaves the right foot free to operate the accelerator. In addition it may be readily built into new cars or attached to old, and it may be quickly disconnected when any adjustments are necessary to the clutch. The above portrays the objects and advantages of my invention when employed to form a new true combination with other usual existing parts of the automobile.

These and such other objects of my invention as may hereinafter appear will be best understood from a description of one embodiment thereof such as is shown in the accompanying drawings in use on a standard type of automobile.

In the drawings, Fig. 1 is a diagrammatic skeleton side elevation of an automobile equipped with my invention.

Fig. 2 is a detailed side elevation partially shown in section of the clutch and adjacent parts with my invention attached.

Fig. 3 is a detailed rear elevation partially shown in section of the clutch and adjacent parts with my invention attached.

Fig. 4 is a plan view of the clutch and adjacent parts showing the driving and driven members of the clutch engaged.

Fig. 5 is a plan view of the clutch and adjacent parts showing the driving and driven members of the clutch disengaged.

Fig. 6 is a perspective view of the pawl and ratchet mechanism.

Fig. 7 is a sectional view of a detached ratchet gear capable of being attached to existing automobiles.

In the drawings, wherein like characters of reference indicate like parts throughout, 10 generally indicates an automobile of standard type. I show an automobile employing the usual gear shifts wherein a series of gears operated by a gear shifting lever enclosed in a gear box are interposed in the transmission system between the actuating means thereof and the wheels to change the speed thereof though it is obvious that my invention may be employed in makes of automobiles employing different systems of speed shifting. I have shown my invention on an automobile equipped with a multiple disk clutch, as these are going into general use with automobiles today, though it is obvious that as all clutches normally have a slidable driven element my invention may be used also in connection with a cone or other type of clutch.

Said automobile 10 is driven as usual by the motor 12 which operates the usual fly-wheel 13. The fly-wheel 13 through the clutch 15 drives the usual propeller shaft 16. As explained the propeller shaft 16 in the embodiment shown is broken, and the usual gear box 20 interposed therein. The forward portion revolved by the slidable element 21 of the clutch 15 I will term the clutch shaft 23, and the rear portion in back of the gear box 20, the transmission shaft 24. The usual gears 25, three or four for forward movement and one for reverse movement are contained as usual in the gear box 20. The gears 25 are shifted to neutral, or in mesh for movement of the vehicle by the usual lever 26. The transmission shaft 24 drives by means of the usual gearing 28 the rear axle 30 on which are mounted the usual wheels 32. It is obvious that the wheels 32 will only operate to move the clutch shaft 23 and attached slidable element 21 of the clutch 15 in a reverse direction when the car tends to roll backwards when the car is in gear.

I will now describe generally how the multiple disk clutch 15 shown operates, though as explained my invention would function in similar fashion if a cone or other type of clutch having a slidable driven element were employed. As explained the fly-wheel 13 is keyed as usual to the crank shaft 34 and is provided with the usual rearward annular extension 36. Said extension 36 is provided with longitudinal runways 38 as usual on the inner periphery thereof, in which the usual lugs 40 of the longitudinally movable driving disks 42 slide as usual. It is thus obvious that the fly-wheel 13 thus drives these disks 42. The usual alternate annular driven disks 44 are provided with the usual lugs 46 extending from their inner periphery which slide as usual in the longitudinal runways 48 provided therefor in the usual collar 50 keyed as usual to the clutch shaft 23. The bolts 52 extend from the front surface of said collar 50 and through holes in the slidable clutch element 21. The bolts 52 are provided with the adjustable nuts 54 on their rear ends, to adjustably vary the pressure exerted by the springs 56 which bear against said nuts 54 and the rear surface of the plate 57 of the slidable element 21. The slidable element 21 of the clutch 15 comprises the plate 57 which corresponds generally in function to the inner cone of a cone clutch, and is normally splined to the clutch shaft 23 as at 59, and a sleeve 58 slidable on the clutch shaft 23, and which is given its slidable movement by the clutch lever 60 pivoted as usual to the frame and connected by the shaft 63 and yoke 61 to said sleeve so as not to revolve therewith. A ball bearing raceway or any suitable type of connection may be employed between said yoke and sleeve 58. The sleeve 58 is provided with the usual thrust bearing 62 and adjusting nut 64.

It is obvious that as the foot is lifted from the clutch lever 60 the springs 56 will force the longitudinally slidable plate 57 inwards causing the driven disks 44 which drive the clutch shaft 23 to frictionally engage the driving disks 42 driven by the fly-wheel 13 and that by means of said frictional engagement the fly-wheel 13 will drive the clutch shaft 23 which will operate the transmission shaft 24 and hence revolve the wheels 32 when the transmission is in gear. It is also obvious that as the foot is pressed down on the clutch lever 60 that the slidable element 21, including the sleeve 58 and plate 57 will be rearwardly withdrawn axially of the clutch shaft 23, preventing frictional engagement of the driving disks 42 and driven disks 44, and permitting the driving disks 42 to revolve free of the driven disks 44 thus no longer driving the clutch shaft 23. If the car is in gear, the slidable element 21 of the clutch is still positively connected to the wheels 32, so that any reverse movement of the wheels 32 will cause reverse movement of the plate 57. It is obvious that this reverse movement of the plate 57 may be eliminated at will by taking the car out of gear.

Though the parts hitherto described, are usual and necessary on most automobiles on the market I have described them in such detail, as they cooperate to provide a one-way brake or reverse preventing device with the parts of my invention about to be described. I provide the rear face of the plate 57 of the slidable element 21 with a plurality of ratchet teeth 66. Though I have shown four teeth in the embodiment shown it is obvious that their number may be varied as desired. Though I have shown the ratchet 66 cast integrally on the rear face of the plate 57 as would be desirable in the construction of new automobiles employing my invention, it is obvious that said teeth might be cut on a plate 68 which could be detachably secured to the rear face of the plate 57 of the present clutches (Fig. 7) and thus my invention could be readily attached to automobiles now in use. My invention could be adapted for use with other types of clutches having a slidable driven element by cutting the ratchet gear 66 thereon, such as on the slidable driven cone of a cone clutch. To a fixed part of the automobile adjacent the slidable driven element 21 of the clutch, I pivot a pawl 70. In the embodiment shown, said pawl 70 is preferably secured to a pawl shaft 72 conveniently mounted in a bearing 74 constructed or mounted on the clutch housing 76. A collar 78 is preferably adjustably secured to said pawl shaft 72. Said collar 78 is preferably split as at 77, and the portions thereof adjustably secured together by the screw 75. Said collar 78 is provided with a notch 79 cut in its outer periphery. A flat spring 80 is suitably secured to another fixed portion, in the embodiment shown being secured by means of the screws 82 to an extension 84 from the clutch housing 76. Said spring 80 is provided near its outer end with a depression 86 normally adapted to engage the notch 79.

The pawl 70 is thus mounted to engage the ratchet 66 when the slidable element 21 of the clutch is withdrawn axially rearwardly, and thus disengaging the driving means from the propelling shaft of the automobile. As explained if the car is in gear any backward motion of the wheels will be transmitted forwardly to the clutch shaft 23 and cause the plate 57 to rotate in a reverse direction. Reverse rotation of the plate 57 and hence backward movement of the car will be prevented by the pawl 70 engaging the ratchet 66. The propelling inertia of the car is so reduced by the gearing 25 that the comparatively small pawl 70 is able to successfully sustain the weight of the whole car.

As stated, I have provided the novel means in pawl and ratchet mechanisms about to be described to prevent the pawl 70 from contacting the ratchet 66 when the clutch 15 is engaged. Fig. 4 illustrates how the depression 86 on the spring 80 then normally rests in the notch 79 in the collar 78 secured to the pawl shaft 72 to prevent the pawl 70 from swinging forward and engaging the ratchet 66 as it is being normally rotated in the operation of the automobile. Fig. 5 illustrates how when the slidable element 21 of the clutch is axially withdrawn to disengage the clutch the pawl 70 is free to slide over the ratchet 66 as the shaft 23 is propelled to give a forward motion to the car, but quickly engages the ratchet 66 when any reverse movement is attempted to be given to the shaft 23 when the car is in gear. When the slidable plate 57 is drawn axially rearwardly it is obvious the depression 86 of the spring 80 will tend to rise out of the notch 79 and the spring 80 will always tend to pivot the pawl 70 so that it may bear tightly against the ratchet 66.

It is obvious that I have provided a true new combination operative by the usual clutch that performs the new and useful result of providing a one-way brake only effective when most needed and when the transmission is in gear, and that the gearing cooperates in this combination to reduce the momentum to make it possible. In addition to providing the combination above described, I have provided an improved device for preventing reverse rotation of a shaft, and a specific improved form of pawl and ratchet mechanism.

It is understood that my invention is not limited to the specific embodiments shown and that various deviations may be made therefrom without departing from the spirit and scope of the appended claims.

What I claim as new and desire to secure by Letters Patent is:

1. In a motor vehicle provided with wheels driven by a transmission system containing the usual gearing and clutch, a safety device for preventing backward movement of said vehicle comprising in combination, a pawl attached to a fixed part of said vehicle and a ratchet gear on the slidable driven element of the clutch adapted to engage said pawl to prevent backward movement of said vehicle when the clutch is disengaged and the transmission in gear.

2. In a motor vehicle provided with wheels driven by a transmission system containing the usual gearing and clutch, a safety device for preventing backward movement of said vehicle comprising in combination, a spring actuated pawl attached to a fixed part of said vehicle and a ratchet gear on the slidable driven element of the clutch adapted to engage said pawl to prevent backward movement of said vehicle when the clutch is disengaged and the transmission in gear.

3. In a motor vehicle, the combination of the wheels, means to propel the same including a transmission system, a set of gearing interposed in the transmission system, clutch mechanism interposed in the transmission system including a driving clutch member and a slidable driven clutch member, means to place the slidable driven clutch member into engagement with the driving clutch member, locking means permanently attached to a fixed part of said vehicle, and means attached to the slidable driven clutch member adapted to engage said locking means to prevent backward movement of the vehicle when the slidable driven clutch member is disengaged from the driving clutch member and the transmission in gear.

4. In a motor vehicle, the combination of the wheels, means to propel the same including a transmission system, a set of gearing interposed in the transmission system, clutch mechanism interposed in the transmission system including a driving clutch member and a slidable driven clutch member, means to place the slidable driven clutch member into engagement with the driving clutch member, a spring actuated pawl permanently attached to a fixed part of said vehicle, and a ratchet gear on the rear face of the slidable driven clutch member adapted to engage said locking means to prevent backward movement of the vehicle when the slidable driven clutch member is disengaged from the driving clutch member and the transmission in gear.

5. In a motor vehicle provided with wheels driven by a transmission system containing the usual gearing and clutch, a safety device for preventing backward movement of said vehicle, comprising in combination, locking means attached to a fixed part of said vehicle, and means on the slidable driven element of the clutch adapted to engage said locking means to prevent backward movement of the vehicle when the clutch is disengaged and the transmission in gear.

6. In a motor vehicle provided with wheels driven by a transmission system containing the usual gearing and clutch, a safety device for preventing backward movement of said vehicle comprising in combination, locking means attached to a fixed part of said vehicle, means on the slidable driven element of the clutch adapted to engage said locking means to prevent backward movement of the vehicle when the clutch is disengaged and the transmission in gear, and means to keep said locking means out of engagement with said clutch when the slidable driven element of the clutch is in engagement with the driving element thereof.

7. In a motor vehicle provided with wheels driven by a transmission system containing the usual gearing and clutch, a safety device for preventing backward movement of said vehicle comprising in combination, a pawl attached to a fixed part of said vehicle, a ratchet gear on the slidable driven element of the clutch adapted to engage said pawl to prevent backward movement of said vehicle when the clutch is disengaged and the transmission in gear and spring means to keep said pawl out of engagement with said ratchet when the slidable driven element of the clutch is in engagement with the driving element thereof.

8. A reverse preventing device for preventing reverse rotation of a clutch driven shaft, comprising in combination, locking means secured to a fixed element adjacent to the clutch, and means on the slidable driven element of the clutch adapted to engage said locking means to prevent reverse rotation of the shaft when the clutch is disengaged.

9. A reverse preventing device for prevent reversing rotation of a clutch driven shaft, comprising in combination, a pawl attached to a fixed element adjacent to the clutch, and a ratchet gear on the slidable driven element of the clutch adapted to engage said pawl to prevent reverse rotation of the shaft when the clutch is disengaged.

10. A reverse preventing device for preventing reverse rotation of a clutch driven shaft, comprising in combination, locking means attached to a fixed element adjacent to the clutch, and means on the slidable driven element of the clutch adapted to engage said locking means to prevent reverse rotation of the shaft when the clutch is disengaged and means to keep said locking means out of engagement with said clutch when the slidable driven element of the clutch is in engagement with the driving element thereof.

11. A reverse preventing device for preventing reverse rotation of a clutch driven shaft, comprising in combination, a pawl attached to a fixed element adjacent to the clutch, a ratchet gear on the slidable driven element of the clutch adapted to engage said pawl to prevent reverse rotation of the shaft when the clutch is disengaged and means to keep said pawl out of engagement with said ratchet when the slidable driven element of the clutch is in engagement with the driving element thereof.

12. In a motor vehicle provided with wheels driven by a transmission system containing the usual clutch, a safety device for preventing backward movement of said vehicle, comprising in combination, a pawl attached to a fixed part of said vehicle and a ratchet gear on the slidable driven element of the clutch adapted to engage said pawl to prevent backward movement of said vehicle when the clutch is disengaged.

13. In a motor vehicle provided with wheels driven by a transmission system coning the usual clutch, a safety device for preventing backward movement of said vehicle, comprising in combination, locking means attached to a fixed part of said vehicle and means on the slidable driven element of the clutch adapted to engage said locking means to prevent backward movement of the vehicle when the clutch is disengaged.

14. In a motor vehicle provided with wheels driven by a transmission system containing the usual clutch, a safety device for preventing backward movement of said vehicle, comprising in combination, locking means attached to a fixed part of said vehicle, means on the slidable driven element of the clutch adapted to engage said locking means to prevent backward movement of the vehicle when the clutch is disengaged and means to keep said locking means out of engagement with said clutch when the slidable driven element of the clutch is in engagement with the driving element thereof.

15. In a motor vehicle provided with wheels driven by a transmission system containing the usual clutch, a safety device for preventing backward movement of said vehicle, comprising in combination, a pawl attached to a fixed part of said vehicle, a ratchet gear on the slidable driven element of the clutch adapted to engage said pawl to prevent backward movement of said vehicle when the clutch is disengaged and spring means to keep said pawl out of engagement with said ratchet when the slidable driven element of the clutch is in engagement with the driving element thereof.

16. In a motor vehicle, the combination of the wheels, means to propel the same including a transmission system, a clutch mechanism interposed in the transmission system including a driving clutch member and a slidable driven clutch member, means to place the slidable driven clutch member into engagement with the driving clutch member, locking means permanently attached to a fixed part of said vehicle, and means attached to the slidable driven clutch member adapted to engage said locking means to prevent backward movement of the vehicle when the slidable driven clutch member is disengaged from the driving clutch member.

17. In a motor vehicle, the combination of the wheels, means to propel the same including a transmission system, a clutch mechanism interposed in the transmission system including a driving clutch member and a slidable driven clutch member, means to place the slidable driven clutch member into engagement with the driving clutch member, a spring actuated pawl permanently attached to a fixed part of said vehicle, and a ratchet gear on the rear face of the slidable driven clutch member adapted to engage said locking means to prevent backward movement of the vehicle when the slidable driven clutch member is disengaged from the driving clutch member.

18. In a motor vehicle provided with wheels driven by a transmission system containing the usual gearing and clutch, a safety device for preventing backward movement of said vehicle, comprising in combination, a pawl attached to the clutch housing of said vehicle and a ratchet gear on the rear face of the slidable driven element of the clutch adapted to engage said pawl to prevent backward movement of said vehicle when the clutch is disengaged and the transmission in gear.

19. In a motor vehicle provided with wheels driven by a transmission system containing the usual gearing and clutch, a safety device for preventing backward movement of said vehicle comprising in combination, locking means attached to the clutch housing of said vehicle, and means on the slidable driven element of the clutch adapted to engage said locking means to prevent backward movement of the vehicle when the clutch is disengaged and the transmission in gear.

20. In a motor vehicle provided with wheels driven by a transmission system containing the usual gearing and clutch, a safety device for preventing backward movement of said vehicle, comprising in combination, locking means attached to the clutch housing of said vehicle, means on the slidable driven element of the clutch adapted to engage said locking means to prevent backward movement of the vehicle when the clutch is disengaged and the transmission in gear, and means to keep said locking means out of engagement with said clutch when the slidable driven element of the clutch is in engagement with the driving element thereof.

21. In a motor vehicle provided with wheels driven by a transmission system containing the usual gearing and clutch, a safety device for preventing backward movement of said vehicle, comprising in combination, a pawl attached to the clutch housing of said vehicle, a ratchet gear on the rear face of the slidable driven element of the clutch adapted to engage said pawl to prevent backward movement of said vehicle when the clutch is disengaged and the transmission in gear and spring means to keep said pawl out of engagement with said ratchet when the slidable driven element of the clutch is engaged with the driving element thereof.

22. In a motor vehicle provided with wheels driven by a transmission system containing the usual gearing and clutch, a safety device for preventing backward movement of said vehicle, comprising in combination, a pawl pivoted on a bracket attached to the clutch housing, a collar on the pawl pivot shaft having a notch on the outer periphery thereof, a ratchet gear on the rear face of the slidable driven clutch element adapted to engage said pawl to prevent backward movement of the vehicle when the clutch is disengaged and the transmission in gear, and a spring element attached to the clutch housing having a depression therein adapted to engage said notch on the collar of the pawl pivot shaft to keep said pawl out of engagement with said ratchet when the slidable driven element of the clutch is in engagement with the driving element thereof.

23. In a motor vehicle provided with wheels driven by transmission system containing the usual clutch, a safety device for preventing backward movement of said vehicle, comprising in combination, a pawl pivoted on a bracket attached to the clutch housing, having a collar on the pawl, pivot shaft notch on the outer periphery thereof, a ratchet gear on the rear face of the slidable driven clutch element adapted to engage said pawl to prevent backward movement of the vehicle when the clutch is disengaged, and a spring element attached to the clutch housing, having a depression therein adapted to engage said notch on the collar of the pawl pivot shaft to keep said pawl out of engagement with said ratchet when the slidable driven element of the clutch is in engagement with the driving element thereof.

24. In a motor vehicle provided with wheels driven by a transmission system containing the usual gearing and clutch, a safety device for preventing backward movement of said vehicle comprising in combination, a pawl pivoted on a bracket attached to the clutch housing having a notch on the outer periphery of the pawl pivot shaft, a ratchet gear on the rear face of the slidable driven clutch element adapted to engage said pawl to prevent backward movement of the vehicle when the clutch is disengaged and the transmission in gear, and a spring element attached to the clutch housing having a depression therein adapted to engage said notch on the pawl pivot shaft to keep said pawl out of engagement with said ratchet when the slidable driven element of the clutch is in engagement with the driving element thereof.

25. In a motor vehicle provided with wheels driven by a transmission system containing the usual clutch, a safety device for preventing backward movement of said vehicle, comprising in combination a pawl pivoted on a bracket attached to the clutch housing having a notch on the outer periphery of the pawl pivot shaft, a ratchet gear on the rear face of the slidable driven clutch element adapted to engage said pawl to prevent backward movement of the vehicle when the clutch is disengaged and a spring element attached to the clutch housing having a depression therein adapted to engage said notch in the pawl pivot shaft to keep said pawl out of engagement with said ratchet when the slidable driven element of the clutch is in engagement with the driving element thereof.

26. A pawl and ratchet mechanism, comprising in combination, a ratchet attached to a slidable element, a pawl pivoted on a fixed element, a collar on the pawl pivot shaft having a notch on the outer periphery thereof, and a spring element attached to a fixed element having a depression therein adapted to engage the notch on the collar of the pawl pivot shaft to keep said pawl out of engagement with said ratchet when the slidable element is moved away therefrom.

27. A pawl and ratchet mechanism, comprising in combination, a ratchet attached to a slidable element, a pawl pivoted on a fixed element having a notch on its pivot shaft, and a spring element attached to a fixed element having a depression therein adapted to engage the notch on the pawl pivot shaft to keep said pawl out of engagement with said ratchet when the slidable element is moved away therefrom.

In testimony whereof he affixes his signature.

FREDERICK HADFIELD.